Aug. 9, 1949. D. W. COOPER 2,478,806
PULLEY, MORE PARTICULARLY FOR AIRCRAFT
Filed April 20, 1948 2 Sheets-Sheet 1
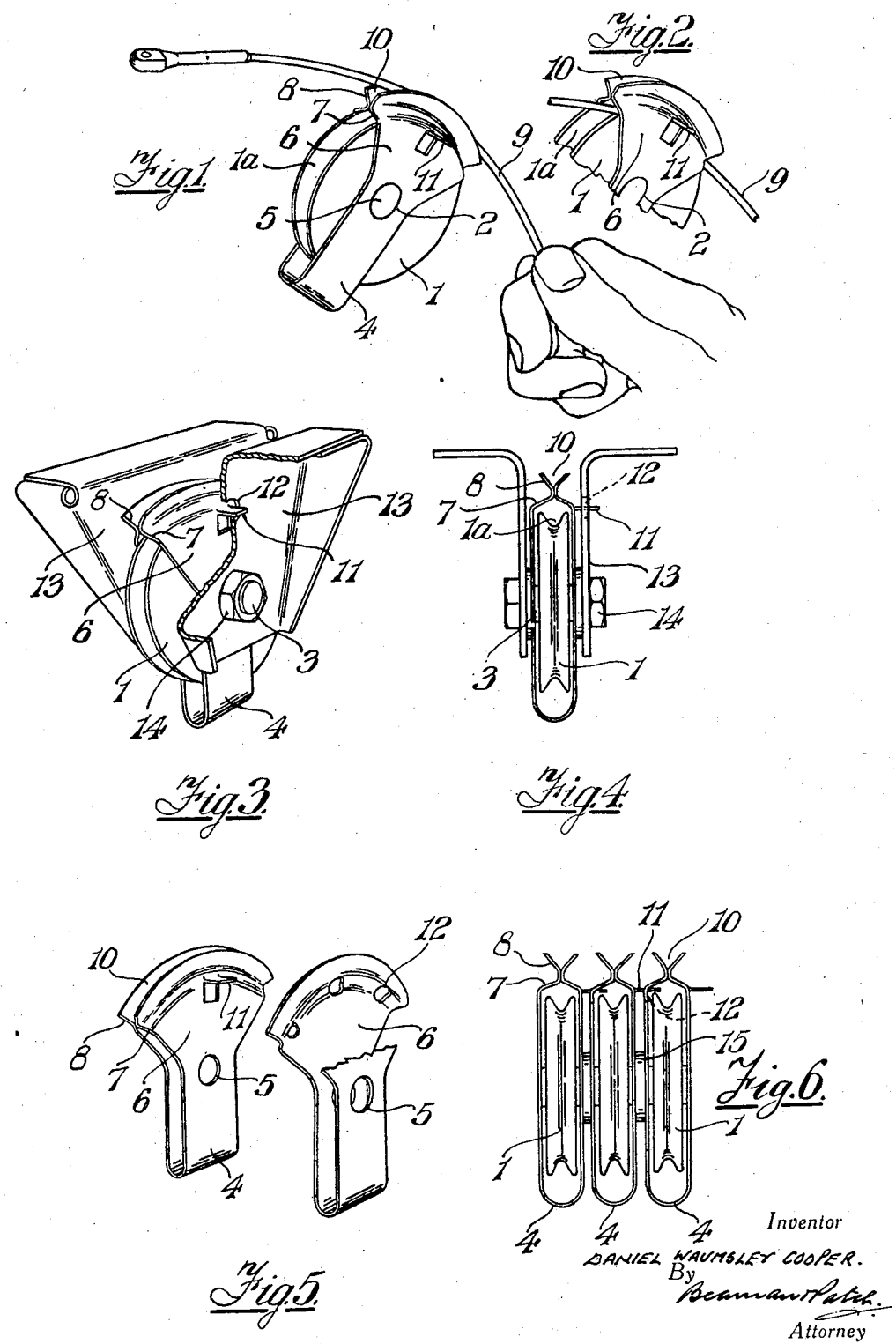

Aug. 9, 1949. D. W. COOPER 2,478,806
PULLEY, MORE PARTICULARLY FOR AIRCRAFT
Filed April 20, 1948 2 Sheets-Sheet 2
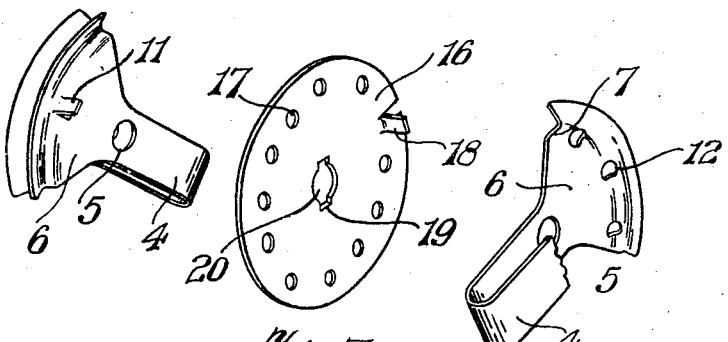
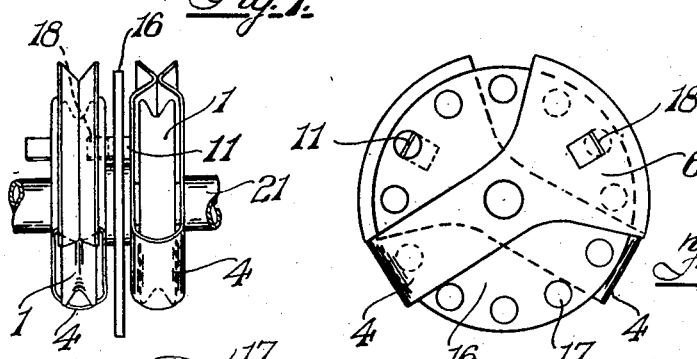
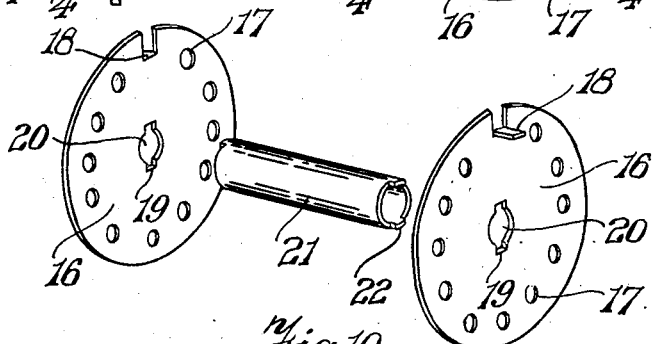
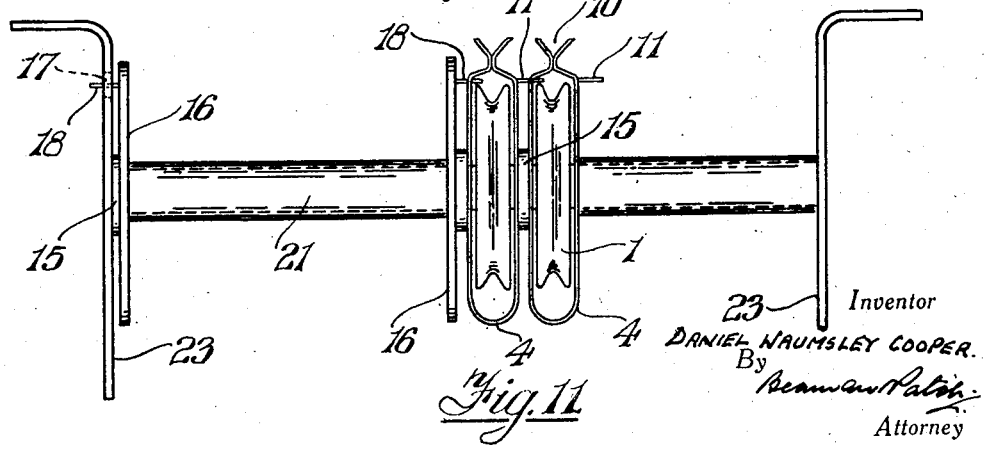
Inventor
DANIEL WAUMSLEY COOPER.
By
Beaumau Patch
Attorney

UNITED STATES PATENT OFFICE 2,478,806

PULLEY, MORE PARTICULARLY FOR AIRCRAFT

Daniel Waumsley Cooper, Southampton, England

Application April 20, 1948, Serial No. 22,148
In Great Britain April 21, 1947

10 Claims. (Cl. 74—240)

1

This invention relates to improvements in connection with pulleys and, without limitation, is more particularly applicable to those employed for the operation of remote mechanical control of aircraft mechanism by means of cables, chains, cords and the like, and which latter for the sake of brevity are hereinafter referred to as cables.

In the fabrication of aircraft it is frequently essential to have remote control cables passing over pulleys, and these pulleys are normally arranged as single or multiple integers upon a static shaft.

The object of this invention is to provide a means for increasing the rapidity of assembly or replacement of a cable complete with swaged or spliced end attachments without the necessity for dismantling pulley guards to allow the passage of such end attachments. When assembly is taking place or in repair or replacement it frequently happens that the cable displaces itself by coming away from its appropriate pulley groove necessitating the operator retaining the cable in a relatively taut condition to preserve its contact with the pulley.

This invention overcomes this difficulty and provides a means for increasing the rapidity of assembly or replacement of a cable or chain whereby the latter is insured of engagement with the pulley periphery enabling the cable to remain in proper relation to its own appropriate pulley when the cable is slack.

A further object is to increase the safety factor of such remote controls and provide a guard that is lockably adjustable to any angle of cable entry and take-off.

The invention consists of improvements in connection with pulleys more particularly for use in aircraft wherein said pulley or pulleys is or are freely mounted upon a shaft and each provided with a spring guard formed as a U sectional entity embracing said pulley about said shaft, each said spring guard having its upper parts of segmental form with inwardly flared contacting lips, the line of contact of said lips lying in a like plane to the centre of the groove of each said pulley but above its perimeter providing thereby a funnel shaped entry for the cable upon said pulley.

The invention further consists in means for varying but fixedly securing the angular position of the said spring guard in relation to the axis of the pulley shaft, and of aligning the spring pulley guards with other said spring pulley guards in relation to a series mounted upon a common shaft.

2

From the above it will be seen that the inwardly flared mouth constituted by the contacting segmental spring guard lips provides a guide for the control cable or chain, and upon the cable being made taut the engaging lips of the guard are pressed apart and the cable engages the pulley groove, whereafter the lips reclose and retain the cable upon the pulley within its groove.

The said guard may be formed in separate parts, but is preferably made from a unitary stamping in spring sheet metal, means being provided to adjustably lock said guard in fixed angular position upon said pulley shaft so as to permit any angle of lead-in and take-off of said cable to and from said pulley.

In order that the invention shall be more fully understood reference is made to the accompanying drawings wherein Fig. 1 shows in perspective elevation a pulley and its guard and the cord intended to be passed to said pulley in its preparatory position for such purpose.

Fig. 2 shows the cord upon the pulley in its operative position having passed the guard.

Fig. 3 shows in perspective elevation a single pulley guard located within a bracket.

Fig. 4 is a side view of Fig. 3.

Fig. 5 shows detail of pulley guards with interlocking devices for adjacent like members.

Fig. 6 shows an assembled series of pulleys and guards using the interlocking arrangements shown in Fig. 5.

Fig. 7 shows a pair of pulley cord guards positioned for assembly for cords to contact pulleys with dissimilar angularity and a perforate and notched disc to achieve interlocking of such guards.

Fig. 8 is a side elevation of a pair of pulleys with their guards assembled for dissimilar angles or cord contact.

Fig. 9 is a front elevation of Fig. 8.

Fig. 10 shows method of mounting discs upon a supplementary tubular shaft.

Fig. 11 shows an assembly of pulley guards, discs and supplementary tubular shaft mounted on a common supporting shaft.

Referring to the drawings and to Figs. 1, 2, 3 and 4, the pulleys 1 are of normal form centrally bored at 2 and adapted to be mounted on a rigid shaft 3. The guard 4 is formed as a resilient U-shaped entity perforated at 5 on both sides to pass over the shaft 3. The distance between the bent-up portions is such as to accommodate a pulley 1, with small clearance. The bent-up arms of the guard 4 terminate at their extremities in segmental enlarged portions or heads 6, which latter are curvedly bent inwards to form arcuate lips 7 and then flared outwardly at 8 to provide a V notch 10. The lips 7 on either side resiliently engage each other over the perimeter of the pulley 1 in the plane of the vertical axis of the pulley groove 1a, and in a form to allow the pulley cord 9 to enter the V notch 10 and be pressed through and past the lips 7 of the guard to rest upon the pulley groove 1a as shown in Fig. 2.

To maintain the pulley cord guard in its desired position at all times the said guard is provided on one side with lugs 11 and on its other side with perforations 12 the latter adapted to receive the lug 11 of an immediately adjacent guard or the lug of a member 16. Thus in Fig. 3 a pulley 1 and guard 4 are shown mounted in a housing 13 the latter having a perforation 12 to receive lug 11. The housing 13 is of a form normally built into aircraft said housing carrying the pulley and guard spindle 3 which latter is externally secured by nuts 14. In Fig. 6 a series of pulleys 1 with guards 4 are shown mounted upon a shaft 3 with distance washers 15 interposed, each guard interlocked with its neighbour by lug 11 on one side of each guard entering perforation 12 of adjacent guard.

In order that the angle of take-off pull of a cord 9 upon any given pulley may be varied in respect of its neighbouring pulleys, arrangements are made whereby the angular dispositions of the said guards or the disposition of a gang of pulleys and guards upon a common shaft may be altered, and secured in their altered position. Reference is made to the illustrations under Figures 7-11 wherein some of the components are shown for effecting the angular change of the guards, or disposition of a gang of pulleys and guards. For these arrangements a disc 16 is provided, which has a circular row of perforations 17, a tongue 18, and double key slots 19 about a central bearing aperture 20. These discs 16 may be mounted upon a tubular shaft 21 which are provided with end castellations 22 which constitute keys to engage the slots 19. In Figs. 10 and 11 an example is shown of a pulley assembly mounted on shaft 21, said shaft carrying discs 16, that disc 16 on the left hand side acting to lock the shaft 21 and disc 16 to the side housing plates 23 of an aircraft, which side housing plates have a circular row of perforations 17 to accord with the disc 16. The disc 16 on the right hand side is used to determine the angular relationship of the guard 4 in respect of the vertical or horizontal axes of the pulleys 1.

In operation the cable, cord or other like flexible member 9 is brought into contact with the contacting lips of the guard 4, the cable in this position resting within the V notch so formed by the outflared sides 8. The cable is then pressed and this pressure forces the resilient lips apart admitting the cable 9 to pass below and enter the groove 1a of the pulley 1. The method of setting the angle of the guard 4 in relation to the vertical or horizontal axis of the shaft has been set out above, but it will also be obvious that this setting can be preselected, or the angle left until the final adjustment of the control cables takes place, since it presents no difficulty to loosen the assembly and adjust the lug 11 in respect to a guard aperture 12 or the lug 18 on disc 16 to either the side member 23 or in respect to a guard aperture 12. When the cable 9 is within the pulley groove 1a it cannot escape, no matter how slack the cable may be or become, thus rendering the operation of coupling up or repair a much simplified task.

Whilst the invention has been described in relation to aircraft and the mode of construction such as is necessary when dealing with light alloy and rustless materials, it is not limited in such respect, the invention being equally applicable to any cable transmission device where pulleys are employed. In some forms for mechanical use the pulleys 1 may be provided with ball bearings or for single pulleys the shaft and pulley may rotate together and the shaft have anti-friction bearings.

I claim:

1. A pulley cable guiding and securing device comprising in combination, a spindle, a pulley mounted on said spindle, a U-shaped guard member mounted on said spindle to embrace said pulley on either side thereof and over a portion at least of the periphery of said pulley, inwardly flared resilient contacting lips formed on said U-shaped guard member, and outwardly flared parts extending from the point of contact of said inwardly flared lips to permit entry of said cable upon said pulley, and an outwardly extending lug protruding from one side of said U-shaped guard.

2. A pulley cable guiding and securing device comprising in combination, a spindle, a pulley mounted on said spindle, a U-shaped guard member mounted on said spindle to embrace said pulley on either side thereof and over a portion at least of the periphery of said pulley, inwardly flared resilient contacting lips formed on said U-shaped guard member, and outwardly flared parts extending from the point of contact of said inwardly flared lips to permit entry of said cable upon said pulley, an outwardly extending lug protruding from one side of said U-shaped guard, and a housing for said guard, said housing being formed with a perforation co-operating with said lug to secure said guard in desired angular position about said spindle.

3. A pulley cable guiding and securing device comprising in combination, a spindle, a plurality of pulleys mounted on said spindle, U-shaped guard members each mounted on said spindle to embrace each said pulley on either side thereof and over a portion at least of the periphery thereof, a protruding lug formed on one side of each of said guard members, the other side of said guard member being formed with perforations to engage the lug of an adjacent guard member to secure said guard members in fixed angular relationship on said spindle.

4. A pulley cable guiding and securing device comprising in combination, a spindle, a plurality of pulleys mounted on said spindle, U-shaped guard members each mounted on said spindle to embrace each said pulley on either side thereof and over a portion at least of the periphery thereof, a protruding lug formed on one side of each of said guard members, the other side of said guard members being formed with perforations to engage the lug of an adjacent guard member to secure said guard members in fixed angular relationship on said spindle and distance washers mounted on said spindle between adjacent pulley guard members to space said guard members.

5. A pulley cable guiding and securing device comprising in combination, a spindle, a pulley mounted on said spindle, a U-shaped guard member mounted on said spindle to embrace said pulley on either side thereof and over a portion at least of the periphery of said pulley, inwardly flared resilient contacting lips formed on said U-shaped guard member, outwardly flared parts extending from the point of contact of said inwardly flared lips to permit entry of said cable upon said pulley, an outwardly extending lug protruding from one side of said U-shaped guard member, a housing for said guard member, said housing being formed with at least one perforation co-operating with said lug to secure said guard member in desired angular position about said spindle, and distance washers mounted on said spindle to space said guard member from said housing.

6. A pulley cable guiding and securing device comprising in combination, a spindle, a plurality of pulleys mounted on said spindle, U-shaped guard members each mounted on said spindle to embrace each said pulley on either side thereof and over a portion at least of the periphery thereof, a protruding lug formed on one side of each of said guard members, the other side of said guard member being formed with perforations, distance washers mounted on said spindle between adjacent pulley guard members, a perforated disc mounted on said spindle and interposed between said distance washers and a protruding lug formed in said perforated disc, said protruding lug of said disc engaging with perforations formed in one side of said pulley guard to secure said guard member in fixed relationship to said disc.

7. A pulley cable guiding and securing device comprising in combination, a spindle, a plurality of pulleys mounted on said spindle, U-shaped guard members each mounted on said spindle to embrace each said pulley on either side thereof and over a portion at least of the periphery thereof, a protruding lug formed on one side of each of said guard members, the other side of said guard member being formed with perforations, distance washers mounted on said spindle between adjacent pulley guard members, a perforated disc mounted on said spindle and interposed between said distance washers and a protruding lug formed in said perforated disc, said perforations in said disc co-operating with said protruding lug formed on one side of said guard member to secure said guard member in fixed angular relationship to said disc.

8. A pulley cable guiding and securing device comprising in combination, a housing, a spindle mounted at either end in said housing, a pulley mounted on said spindle, a U-shaped guard member mounted on said spindle to embrace said pulley on either side thereof and over a portion at least of the periphery of said pulley, one side of said guard member being formed with perforations therein, a distance washer mounted on said spindle adjacent said perforated side of said guard member, a disc mounted on said spindle adjacent said distance washer, a projecting lug formed on said disc and arranged to engage with said perforations in said guard member, a supplementary tubular shaft mounted on said spindle between said disc and one side of said housing, said tubular shaft being formed with castellations at its ends, a further disc mounted on said spindle between said tubular shaft and the said side of said housing, a projecting lug formed on said further disc and arranged to engage in one of a series of perforations formed in the said side of said housing, said discs being formed with castellations arranged to engage with said castellations on said tubular shaft to secure said discs and said guard member against rotation on said spindle.

9. A pulley cable guiding and securing device comprising in combination, a housing, a spindle mounted at either end in said housing, a pulley mounted on said spindle, a guard member mounted on said spindle to embrace said pulley on either side thereof and over a portion at least of the periphery of said pulley, one side of said guard member being formed with perforations therein, a projecting lug formed on the other side of said guard member, a further guard member mounted on said spindle adjacent said first said guard member, said further guard member being formed with perforations in one side thereof engaging with said projecting lug on said first said guard member to secure said guard members in desired relative angular position on said spindle, distance washers mounted on said spindle adjacent said perforated sides of said guard members, a disc mounted on said spindle adjacent the distance washer adjacent said perforated side of said first said guard member, a projecting lug formed on said disc and arranged to engage with said perforations in said first said guard member, a supplementary tubular shaft mounted on said spindle between said disc and one side of said housing, said tubular shaft being formed with castellations at its ends, a further disc mounted on said spindle between said tubular shaft and the said side of said housing, a projecting lug formed on said further disc and arranged to engage in one of a series of perforations formed in the said side of said housing, said discs being formed with castellations arranged to engage with said castellations on said tubular shaft to secure said discs and said guard members against rotation on said spindle.

10. A pulley cable guiding and securing device comprising in combination, a spindle, an U-shaped guard member rotatably mounted on said spindle for angular adjustment relatively to said pulley, said guard having a base and radial side arms and embracing said pulley with the said side arms extending diametrically with clearance on either side of the pulley and said base extending across a portion of the outer periphery of the pulley in radially outward spaced relation thereto, said side arms at their outer ends remote from said base projecting beyond the outer periphery of the pulley, and inwardly flared resilient contacting lips on the projecting arm ends defining an outer open arcuate channel in which a cable can be introduced to spring said lips apart for the entry and location of said cable upon an elected and desired peripheral portion of the pulley, depending upon the angular dispositioning of said guard relatively to the pulley.

DANIEL WAUMSLEY COOPER.

REFERENCES CITED

The following references are of record in the file of this patent:

UNITED STATES PATENTS

| Number | Name | Date |
|---|---|---|
| 1,380,495 | Oliver | June 7, 1921 |
| 1,767,774 | Sachse | June 24, 1930 |